United States Patent [19]

Robbins, III

[11] Patent Number: 4,910,280

[45] Date of Patent: Mar. 20, 1990

[54] MODULAR DOCK BUMPER

[76] Inventor: Edward S. Robbins, III, 459 N. Ct., Florence, Ala. 26360

[21] Appl. No.: 333,037

[22] Filed: Apr. 4, 1989

Related U.S. Application Data

[62] Division of Ser. No. 72,049, Jul. 10, 1987.

[51] Int. Cl.⁴ .............................................. B32B 3/26
[52] U.S. Cl. ........................................ 428/71; 428/31;
428/33; 428/53; 428/318.6; 428/319.3
[58] Field of Search ...................... 428/31, 33, 53, 54, 428/58, 59, 71, 318.6, 319.3

[56] References Cited

U.S. PATENT DOCUMENTS

| | | | |
|---|---|---|---|
| 3,856,613 | 12/1974 | Weller | 428/31 |
| 4,246,303 | 1/1981 | Townsend | 428/31 |
| 4,598,001 | 7/1986 | Watanabe et al. | 428/31 |

*Primary Examiner*—William J. Van Balen
*Attorney, Agent, or Firm*—Nixon & Vanderhye

[57] ABSTRACT

Building or construction related components such as floor tiles, ceiling tiles, trim moldings, corner guards, sound proofing or insulating panels, dock bumpers and the like are formed by blow molding a hollow parison to the desired exterior shape, such that the parison becomes the exterior surface of the desired article, and thereafter blowing a plastic foam composition into the interior of the parison. Integrally formed male and female connectors for sliding, or snap-fit engagement are provided to attach moldings and other components in end-to-end relationship with each other, or to wall surfaces and the like. In an alternative embodiment, coextrusion is employed to form the various construction related components.

6 Claims, 8 Drawing Sheets

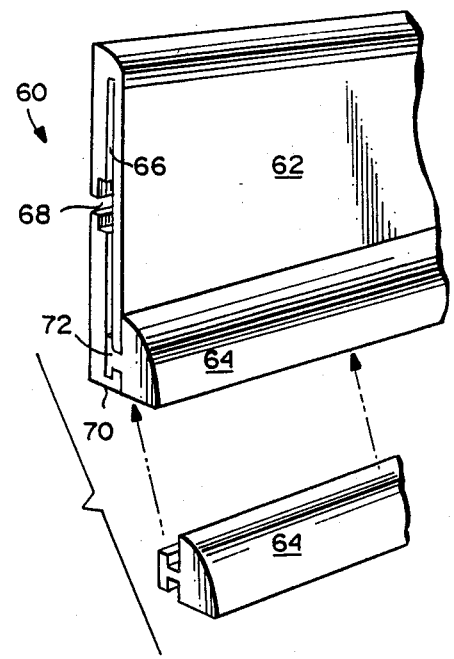
FIG. 12
FIG. 13A
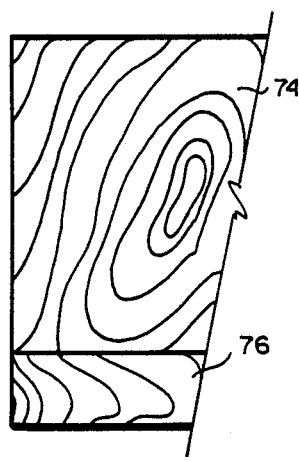
FIG. 13B
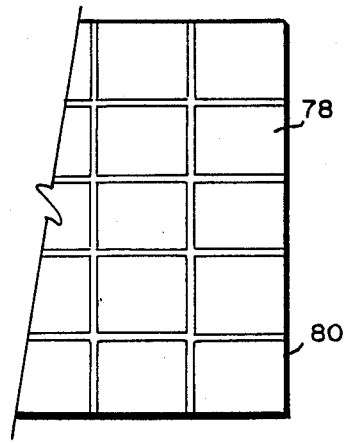
FIG. 14A
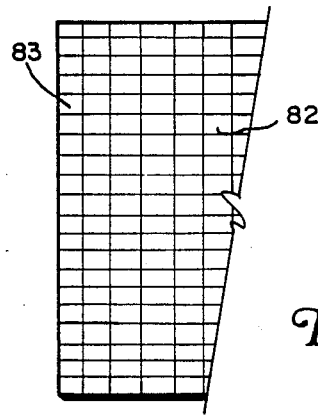
FIG. 14B
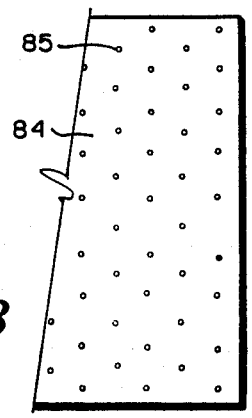

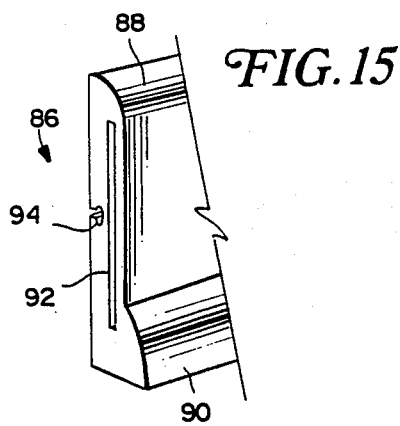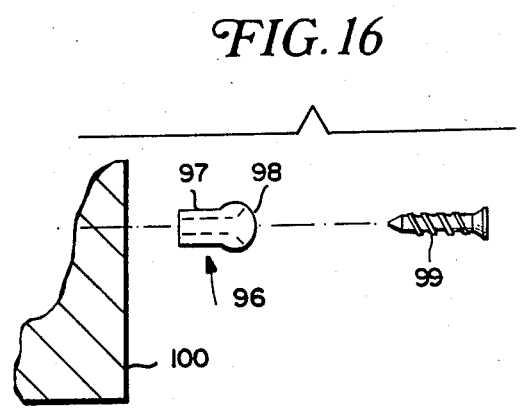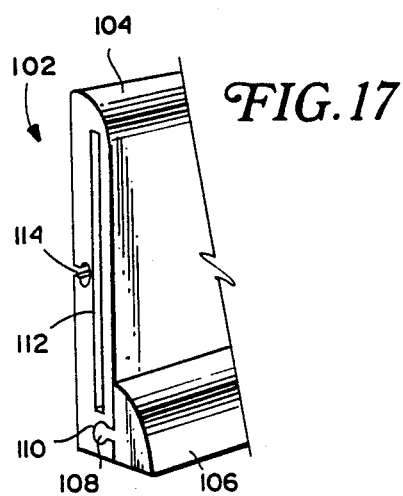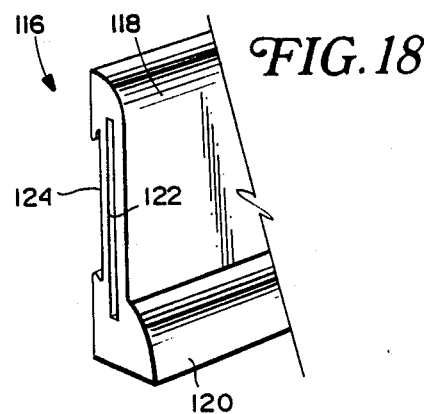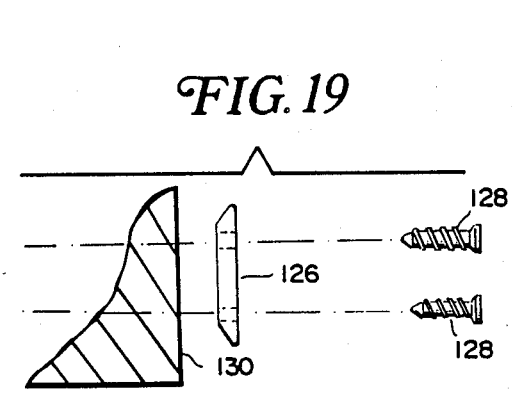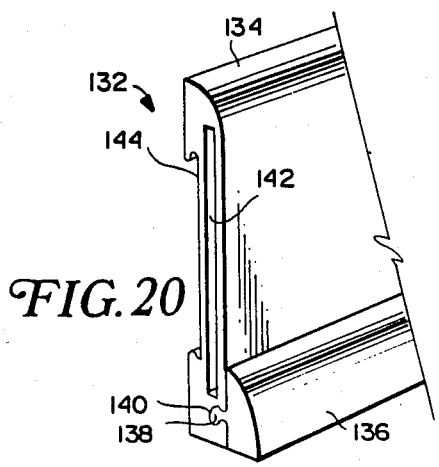

MODULAR DOCK BUMPER

This is a division of application Ser. No. 07/072,049, filed July 10, 1987.

BACKGROUND AND SUMMARY OF THE INVENTION

This invention relates to a method of manufacturing building or construction related components such as floor tiles, ceiling tiles, trim moldings, corner guards, sound proofing or insulating panels, truck and boat dock bumpers and the like.

It is known to form door panels, and other construction type panels, as well as decorative wall tiles, in a sandwich type configuration wherein an outer shell is combined with a core comprising a foamed plastic material. For example, in U.S. Pat. No. 3,811,996, a composite, artificial wall tile is disclosed wherein an upper sheet, provided with a decorative appearance, is combined with a second, rigid backing sheet. These sheets are positioned on either side of a layer of resilient material, such as polyurethane foam, and secured about their respective free edges by heat sealing, epoxy adhesive, or the like.

In U.S. Pat. No. 3,844,523, there is disclosed a method of molding foamable materials to form furniture products, picture frames, trim, simulated ceiling beams and the like, wherein a mold is initially sprayed over its entire interior surface with a release agent and/or a barrier coat before a foam material is poured into the mold. The release agent enables the foam molded part to be easily removed from the mold while, a barrier coat if utilized, adheres to the foam and becomes a continuous outer surface of the foam part.

In U.S. Pat. No. 4,221,624, there is disclosed a method of manufacturing sheet material comprising a foamed core and upper and lower thermoplastic skins, all three of which are coextruded.

U.S. Pat. No. 4,463,043 discloses building panels wherein one or more outer layers of cured resin are sandwiched about foam core blocks, with or without stiffening webs between the blocks.

In U.S. Pat. No. 3,844,523, a structural door panel frame is covered with relatively thin surface skins of acrylanitrile butidiene styrene for example, which are initially bonded to the frame, after which a core is foamed in place to completely fill the interior of the panel.

In U.S. Pat. Nos. 3,389,196 and 3,090,078, methods of making insulated building panels are disclosed wherein outer facing elements are arranged about marginal spacer elements to form hollow interiors which are subsequently filled with a foamable resin composition.

None of the above methods have proven to be completely satisfactory, particularly insofar as multiple manufacturing and assembly steps are required and, in most instances, unless marginal frame members are used, the core composition is exposed at the peripheral edges of the product.

It is the object of this invention to provide a relatively simple and inexpensive process for forming floor tiles, ceiling tiles, trim such as cove base moldings, chair rails, corner guards, truck and boat dock bumpers, sound proofing or other insulating panels and the like.

In the present invention, conventional blow molding or coextrusion techniques are employed in a novel process for forming the articles described above.

In one exemplary embodiment of the invention, a round or square parison is extruded and subsequently blow-molded within appropriately shaped clamp molds to form a one-piece, hollow shell having the desired exterior shape of the finished product. Thereafter, a foamable plastic material is blown into the interior of the shell. The foam material may be blown into the parison while the latter is within the clamp mold, or, alternatively, the parison may be removed from the clamp mold and transferred to a separate foam injection line.

The outside skin, or parison, is preferably formed of a vinyl or other suitable polymeric material, while the foam core is preferably formed of polyurethane, vinyl, or other suitable thermoplastic or thermosetting foam material.

In an alternative embodiment of the invention, the outer polymeric material and inner, foamable plastic material are coextruded through a die formed to provide a composite of the desired cross-sectional configuration. As will be understood by those skilled in the art, the supply of the inner foamed plastic material will be interrupted as required depending on the length of the extruded article, to form the outer end walls of the extruded articles. If the process is a continuous one, the elongated strips may be cut at the solid, interrupted area of the extrusion to form individual articles.

It will be understood that various textures and colors may be incorporated into the formation of the above described articles to provide the desired decorative effect. For example, the pigmentation required to achieve the desired color shade can be added to the plastic composition prior to coextrusion or blow molding. In addition, decorative films can be applied to the walls of the clamp molds so that during the final formation of the parison to the desired shape, the film will permanently adhere to the exterior surface of the parison and be incorporated into the final product. The die surface of a coextrusion die can also be configured to achieve desirable surface effects.

In the production of cove base and other trim moldings in accordance with this invention, it is possible to achieve a real wood look in the sense that the molding can be manufactured with the same thickness and other three dimensional characteristics of real wood molding. For example, wood cove base molding is typically combined with quarter round molding at the lower edge of the cove base to provide a custom finished look. In the present invention, the clamping molds or coextrusion dies may be configured to produce a final cove base product which integrally incorporates the shape of a quarter round molding in the lower part of the cove base. Cove base moldings and other trim items such as chair rails and corner guards can also be produced in accordance with the subject invention in straight sections, or with the exception of the corner guards, in the form of inside or outside corner sections to provide, in effect, perfect corner joints which have a distinctly mitered appearance. The molds or dies may also be configured to incorporate integral male and female connectors into the parison so that various straight and/or corner sections of the cove base molding may be slidably assembled or snap-fit, one to the other, to provide a continuous appearance.

It is a further feature of the invention that attachment rails be provided to facilitate attachment of trim moldings and corner guards to walls or other surfaces. These rails may be of a blow molded or coextruded composite construction similar to the molding itself, or they may be manufactured as solid extrusions, etc. The rails are configured to slidably receive an associated molding, or, preferably, they may be configured to have the molding snap fit over the attachment rail. In a related aspect, the quarter round portion of a cove base molding may be made detachable from the cove base per se, with similar sliding or snap-fit connection structure.

It will also be understood that floor and ceiling tiles may be produced in accordance with the invention which have greater or lesser degrees of resilience, depending on the composition of the foam core interior. The resiliency or cushioning effect which is imparted to floor tile, for example, can provide a degree of safety when used in environments frequented by older persons or infants who are otherwise more likely to suffer falls, etc.

The combination of an outer, integral shell coupled with the resiliency and cushioning effect of the foam is particularly advantageous in the manufacture of modular bumper seals, often used as docking bumpers around truck and boat docks or bays and the like.

Articles formed in accordance with the present invention are characterized by attractive appearance, durability, cleanability, and are relatively inexpensive and simple to manufacture.

Other objects and advantages of this invention will become apparent from reading the detailed description of the invention in conjunction with the accompanying drawings.

BRIEF DESCRIPTION OF THE DRAWINGS

FIG. 12 is a partial perspective of a cove base as illustrated in FIG. 10 but wherein the quarter round portion is detachable;

FIGS. 13a and 13b illustrate exterior surface patterns of the type which may be incorporated into the cove base molding of this invention;

FIGS. 14a and 14b illustrate texture patterns which may be applied to the wall facing surface of trim molding formed in accordance with this invention;

FIG. 15 is a partial perspective of a length of cove base molding in accordance with still another embodiment of the invention;

FIG. 16 is a side view of an alternative embodiment of an attachment rail designed to be secured to a wall surface, and to which a cove base as illustrated in FIG. 15 may be attached;

FIG. 17 is a partial perspective of a cove base as illustrated in FIG. 15 but wherein the quarter round portion is detachable;

FIG. 18 is a partial perspective of another cove base construction in accordance with the invention;

FIG. 19 is a side view of another embodiment of an attachment rail designed for use with the cove base illustrated in FIG. 18;

FIG. 20 is a partial perspective of a cove base as illustrated in FIG. 18 but wherein the quarter round portion is detachable;

DETAILED DESCRIPTION OF THE INVENTION

Figure 1:
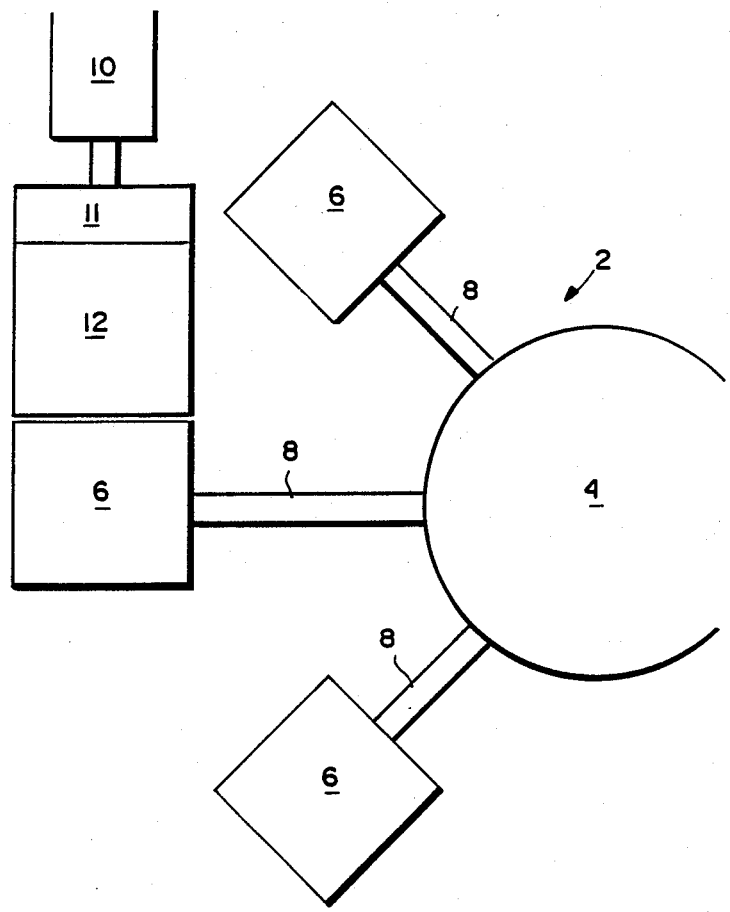
FIG. 1 is a schematic diagram of a conventional blow-molding apparatus which may be used in carrying out the process of this invention.

Referring to FIG. 1, a conventional blow molding apparatus is schematically illustrated, including a rotating clamp mold jig 2 which includes a central hub 4 and a plurality of clamp molds 6 mounted on radially outwardly extending arms 8. The rotating jig cooperates with an extruder 10 which extrudes a parison 12 from an extrusion head 11 for subsequent clamping engagement within the mold 6. The parison 12 may be formed in a round, i.e., cylindrical, or substantially square or rectangular configuration which is subsequentlY blow-molded in a conventional manner to the final exterior shape of the desired product within the clamp molds 6. A square or rectangular parison is preferable when forming square or rectangular products such as floor or ceiling tiles, and even cove base moldings since less thinning of the material in the corners of the clamp mold will occur during the blow-molding process.

Once a parison is correctly positioned within a clamp mold 6, the blow molding operation commences to blow the material against the interior mold surfaces which have been formed precisely to create the desired exterior surface configuration of the product. The resulting blow molded parison is a one-piece, hollow shell, continuous over its entire surface with the exception perhaps of a single aperture from which the blow pin is removed.

A foamable plastic composition is subsequently introduced into the precisely formed parison in prescribed amounts such that, after curing, the core material will substantially fill the interior surface of the blow molded parison, or skin, without creating undue strain on the parison. It will be understood that the foaming operation may take place while the parisons are held within the molds 6, or the parisons may be removed from the molds and transferred to a separate foam injection line as desired. It will be further understood that the foam can be blown into the parison utilizing the blow pin hole or, if the blow pin hole is closed at the termination of the blow molding process, another relatively small hole may be formed in the parison to permit introduction of the foam.

Figure 32:
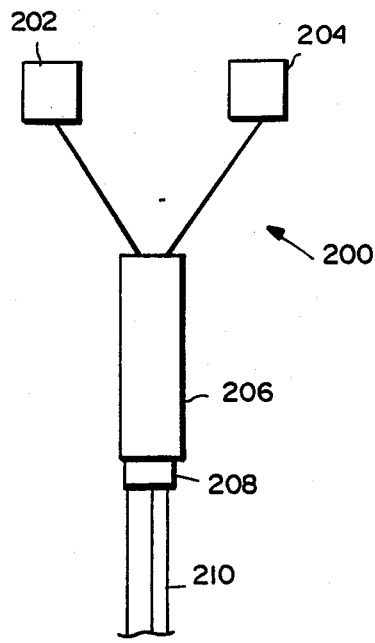
FIG. 32 is a schematic diagram of a coextrusion apparatus which may be used to form various articles in accordance with the invention.

In FIG. 32, a conventional coextrusion apparatus is shown, including a supply 202 of polymeric material to become the outer skin, and a supply 204 of thermoplastic foam material, to become the inner core. These materials are fed to an extruder 206 where they exit a suitably formed extrusion die 208. In the example illustrated, a cove base 210 is illustrated exiting the die 208. It will be appreciated that any of the above-mentioned articles may be produced by coextrusion as well as by blow molding.

Figure 2:
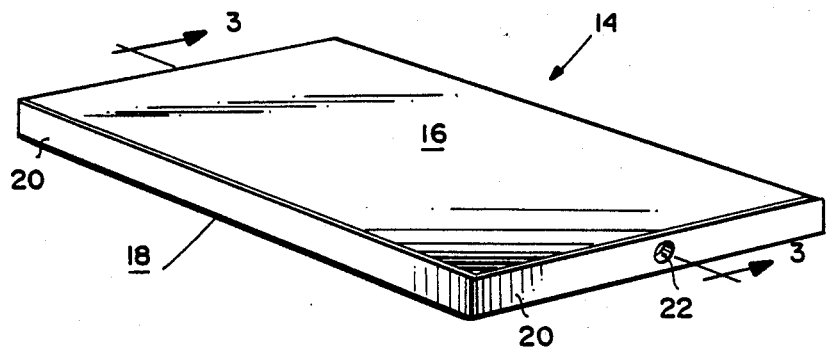
FIG. 2 is a perspective view of a floor tile formed in accordance with an exemplary embodiment of the invention.
Figure 3:
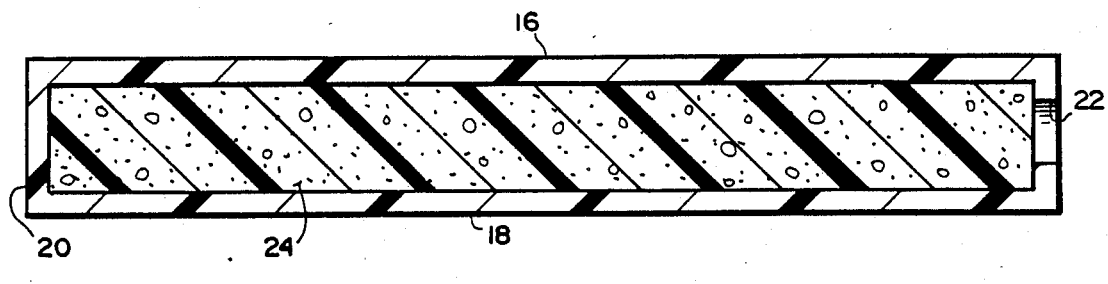
FIG. 3 is a cross-sectional view taken along the line 3—3 of FIG. 2.
Figure 5:
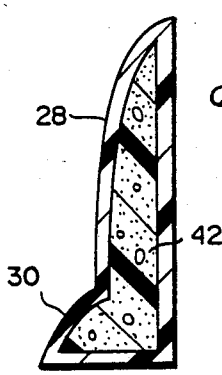
FIG. 5 is a cross-sectional view taken along the line 5—5 of FIG. 7.

With reference now to FIG. 2, there is shown an exemplary embodiment of a floor tile formed in accordance with the process of this invention. In accordance with one embodiment of the invention, the exterior skin of the tile 14 is essentially a blow-molded parson formed in clamp molds configured to achieve the desired appearance, and including an upper surface 16, a lower surface 18 and side edge surfaces 20. The interior or core of the tile is filled with a foam plastic composition 24 introduced through an aperture 22 in one of the side edge surfaces 20. As previously indicated, the aperture 22 may be the blow pin hole formed during the blow molding process, or in the event blow pin hole was closed off at the conclusion of the blow molding process, a new aperture may be provided.

The outside skin of the tile is preferably on the order of about 1/16th inch in thickness and is preferably comprised of a vinyl plastic or other suitable polymeric material. However, the thickness can range from about 0.020 of an inch up to about 0.150 of an inch. The foam composition may be any conventional polyurethane, vinyl or other thermoplastic or thermosetting foamable material. In floor tile applications, the foam interior would typically be between one-eighth and one-quarter inch in thickness, although for other applications, such as sound insulation panels, the foam core may be as much as an inch or more in thickness, and for modular bumper seals, several inches in thickness.

As previously mentioned, the tile constructions discussed hereinabove may be formed by conventional coextrusion techniques as well, with intermittent interruption of the inner foamed core to define end surfaces of the tile transverse to the direction of movement of the extruded material away from the die.

It will be understood that textures, colors, and decorative designs in the form of adhesive films, may be incorporated into the upper surface 16 of the tile. At the same time, it will be appreciated that if the tile is to be of the dry back type, a suitable texture may be applied to the underside of the tile to facilitate bonding to a floor or other surface with suitable adhesive.

It will be appreciated that ceiling tiles or sound insulating panels will have substantially the same appearance and be formed in substantially the same manner as the above described floor tiles, with minor differences in exterior dimensions and/or thicknesses, as well as in the particular ingredients of the foamed core.

It will further be understood that, depending on the particular application, the resilience of the tile or panel may be altered by modifying the plastic foam composition in a manner well known to those skilled in the art.

Figure 4:
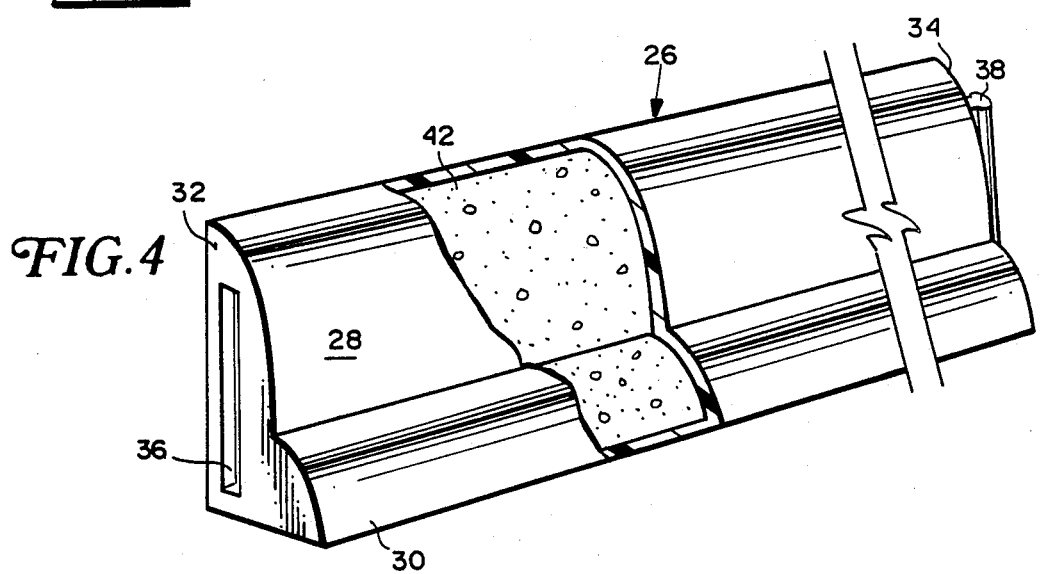
FIG. 4 is a perspective view of a section of cove base trim molding formed in accordance with an exemplary embodiment of the invention, partially cut away to illustrate the foam interior.
Figure 6:
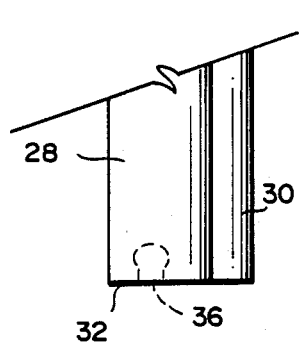
FIG. 6 is a partial top view of the female connector end of the cove base illustrated in FIG. 4.
Figure 7:
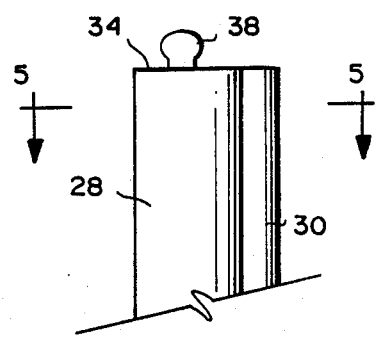
FIG. 7 is a partial top view of the male connector end of the cove base illustrated in FIG. 4.

FIGS. 4–20 illustrate the application of a blow molding or coextrusion process to the manufacture of cove base moldings. FIG. 4 illustrates a cove base molding 26 including an upper cove base portion 28 and a lower projecting portion 30 which simulates a conventional quarter round molding typically used in conjunction with cove base molding. The cove base molding 26 is formed in the same manner, and of the same materials, as the floor tile illustrated in FIG. 1, the principal difference being that the interior surfaces of the molds 6 or coextrusion die 208 are formed to provide the exterior shape of the cove base molding. FIG. 4 also illustrates an integrally formed interconnection system for securing two or more axially aligned cove base sections. Thus, on one end 32 a female rounded connector slot 36 is formed interiorly of the cove base, while on the opposite end 34 a flexible male rounded connector 38 is integrally formed with the cove base molding and projects from the edge surface 34 as more clearly illustrated in FIGS. 6 and 7. The stem and rounded head configuration of the male and female connectors establish a "ball and socket" type configuration so that the male end of one section may be coupled or snapped to the female end of an adjacent section. This may be repeated as necessary to form an essentially continuous molding along an extended wall surface. The male/female arrangement provides for a secure connection between the adjacent cove base sections and, at the same time, allows for normal expansion and contraction of the material due to temperature variations.

It will be understood that other configurations may be employed for the male/female connections at the aligned end faces of adjacent lengths of molding. For example, T-shaped connectors and conventional tongue and groove connectors, as well as any other suitable male/female arrangement may be employed.

Figure 8:
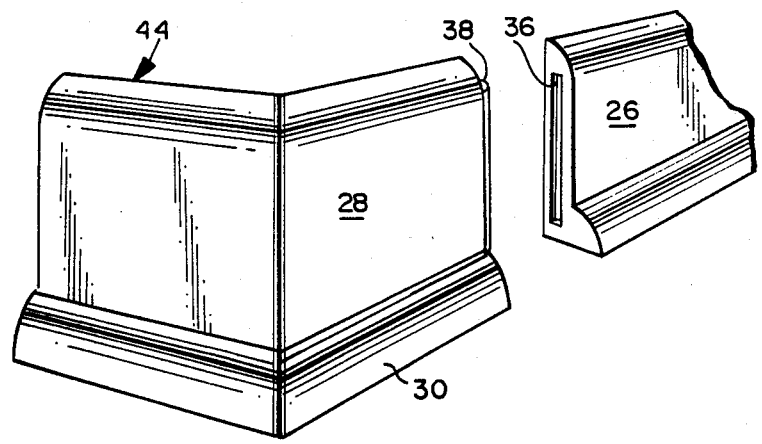
FIG. 8 is a perspective view of an outside corner section of cove base molding formed in accordance with the subject invention in exploded relationship to a partially illustrated length of adjacent cove base molding.
Figure 9:
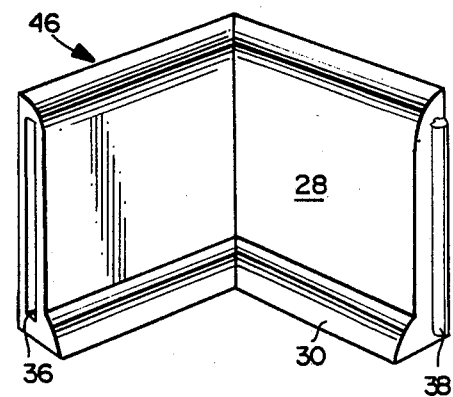
FIG. 9 is a inside corner section of cove base molding formed in accordance with the invention.

Turning now to FIG. 8, there is illustrated an outside corner section 44 of a cove base molding, one end of the corner section provided with an integrally formed flexible male connector 38 for mating engagement with an integrally formed female connector slot 36 on an adjacent end of a cove base straight section 26 of the type illustrated in FIG. 4. Here again, it will be appreciated that the right angle configuration of the outside corner section is achieved by appropriate design of the clamp molds 6. In FIG. 9, an inside corner section 46 of a cove base molding is shown, provided with an integrally formed female connector slot 36 at one end surface, and an integrally formed, flexible male connector 38 formed at the other end surface. It will thus be appreciated that this invention permits the manufacture of blow molded (the right angle configuration of these items does not lend itself to coextrusion techniques) right angle corner moldings as illustrated in FIGS. 8 and 9, with a mitered appearance, in an inexpensive manner which greatly reduces and simplifies the effort normally associated with the installation of custom molding.

Figure 10:
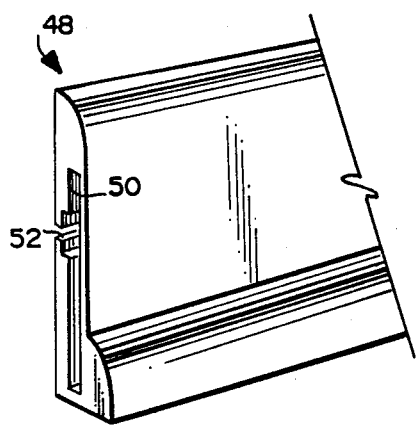
FIG. 10 is a partial perspective of a length of cove base molding in accordance with an alternative embodiment of the invention.

FIG. 10 illustrates a further embodiment of the invention wherein a blow molded or coextruded straight cove base section 48 is formed in the manner described with respect to FIGS. 4–7, including a vertical connector slot 50 integrally formed in one end surface of the cove base. There is also provided a horizontal T connector slot 52 extending along the entire length of the cove base molding, along the back, or wall engaging surface thereof. This female T connector slot 52 is adapted for mating engagement with a male T connector rail 54, shown in FIG. 11. The male T connector rail 54 may be provided with a plurality of laterally spaced apertures 56 for receiving wood screws or other suitable connectors for fastening the rail to a wall 60 at a height corresponding to placement of the cove base molding. It will be understood that the cove base section 48 may be flexed to permit the cove base to be applied over the male T connector rail to firmly and securely hold the cove base molding against the wall 60. Alternatively, the cove base section may be introduced onto the rail at one end, and thereafter slidably pulled over the rail until it is engaged over the entire length of the rail.

It will be understood that the cove base molding in all of the embodiments described hereinabove, may be fastened to the wall surface with adhesive applied to its back surface, with or without further utilization of the structural connection obtained by male T connector rail 54 and associated slot 52. It is nevertheless advantageous to forego the use of adhesive so that the molding is able to expand and contract along the connector rail.

In FIG. 12, a further aspect of the invention is disclosed wherein a blow molded or coextruded cove base molding 62 is provided with a detachable quarter round section 64. As in the FIG. 10 embodiment, a vertical female connector slot 66 is illustrated at one end of the cove base molding along with a horizontally oriented female T connector slot 68 for use with an associated male T connector rail. An additional horizontal female T connector slot 70 is formed in the lower front surface of the cove base section 62 for receiving a mating male T connector portion 72 formed along the rear surface of the detachable quarter round section 64. The quarter round section 64 may be a solid plastic extrusion or it may be comprised of an exterior skin and interior foam composition as in the case of the cove base section 62 formed by blow molding or coextrusion. This arrangement is particularly advantageous insofar as it allows removal of the quarter round section for installation of carpet, floor tile or other floor covering and subsequent replacement of the quarter round molding to provide an attractive, neat and custom appearance.

Figure 11:
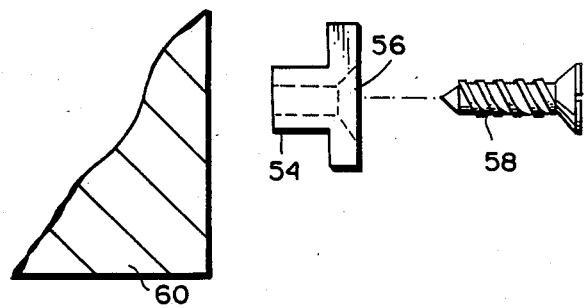
FIG. 11 is a side view of an attachment rail designed to be secured to a wall surface, and to which a cove base as illustrated in FIG. 10 may be attached.

It is important to note that in the cove base constructions illustrated in FIGS. 10–12, that the male, female connector arrangement permits expansion and contraction of the cove base with respect to the male T connector rail 54 as well as with respect to the removable quarter round section 64. This is an advantage over certain prior art constructions where adhesive is the sole means by which plastic cove base molding is secured to a wall and, as a result, expansion and contraction over long periods of time causes the cove base to pull away from the wall surface. This problem is eliminated by the cove base constructions shown in FIGS. 10–12.

Referring now to FIGS. 13a and 13b, there are illustrated just two of the many possible surface texture designs which may be applied to the cove base molding front side, i.e., that side which is visible after installation. FIG. 13a illustrates a cove base including an upper portion 74 and a quarter round portion 76 with a wood grain appearance which is achieved by either forming the interior surface of the clamp molds 6 to have wood grain surface texture, or by applying a wood grain film to the interior mold surface which adheres to the parison during the blow molding operation. In FIG. 13b, the cove base molding is illustrated having a top portion 78 and a quarter round portion 80 provided with a contemporary design which may be achieved in the same manner as described hereinabove with respect to FIG. 13a.

FIGS. 14a and 14b likewise show texture variations which may be applied, via suitable clamp mold interior surface design, to the back side, i.e., that side which engages the wall surface, to facilitate good bonding of the cove base molding to the wall surface in the event that adhesive composition is employed to secure the cove base to the wall. In FIG. 14a, a square or rectangular pattern 82 is applied to the back side 83, whereas in FIG. 14b, a cove base 84 is shown with a series of raised projections 85. Such patterns are not needed if it is determined to utilize a connector rail, as described hereinabove, to fasten the molding to the wall.

FIGS. 15–17 illustrate further embodiments of blow molded or coextruded composite cove base moldings in accordance with the present invention. In FIG. 15, the cove base molding 86 is illustrated including an upper portion 88, a lower integrally formed quarter round section 90, and a female connector slot 92 of the type previously described. In addition, a stem and rounded head connector slot 94 is provided along the back side extending the entire length of the cove base molding for mating engagement with a correspondingly shaped rail attachment described hereinbelow.

In FIG. 16, an attachment rail 96 is shown which is formed in a snap-fit configuration including a stem 97 and a rounded head 98 which may be fastened by screws 99 or other suitable fasteners to a wall surface 100. It will be understood that the cove base molding may be snapped easily over the attachment rail into firm engagement with the wall. Moreover, this rounded type configuration is particularly useful and, is the preferred attachment means, because the "snap-on" characteristic enables it to be used to secure all forms of products of the present invention. Furthermore, it is noted that this "ball and socket" type configuration is substantially easier to make by (for example) blow molding than is a T-shaped configuration. Also, a dove-tail configuration, described in greater detail hereinbelow, can be utilized to obtain a similar "snap-on" characteristic.

With respect to FIG. 17, a cove base molding 102 is shown which includes an upper section 104 and a removable quarter round portion 106. The quarter round portion includes a male connector 108 having a configuration similar to that of the previously described attachment rail 96. At the same time, portion 104 of the cove base molding is provided with a complimentary-shaped female groove 110 which receives the projection 108 in a snap-fit engagement. The cove base is further illustrated to include a vertical connector slot 112 (for effecting end-to-end connection as previously described) and a horizontal, slot 114 for attachment to a rail having the configuration illustrated in FIG. 16.

FIGS. 18-20 illustrate still another embodiment of blow molded or coextruded cove base molding formed in accordance with the subject invention. In FIG. 18, a cove base 116 is shown having an upper section 118 and a lower, integrally formed quarter round portion 120. A female slot 122 is formed in one end of the cove base molding and a relatively wide dovetail groove 124 extends along the entire back side of the cove base 116. The groove 124 is designed to be snap-fit over a correspondingly shaped attachment rail 126, shown in FIG. 19, which may be fastened via screws 128 to a wall surface 130. It will be understood that the relatively wide attachment rail 126 of this embodiment, formed as a solid extrusion or as a blow molded or coextruded composite, ensures good surface contact between the cove base molding and the wall surface for a tight, neat appearance.

In FIG. 20, a blow molded or coextruded cove base molding 132 is shown having an upper portion 134 and a removable quarter round portion 136. The quarter round portion is formed with a male connector 138 which may be snap-fit into a complimentary-shaped slot 140 formed on the lower portion of the cove base. A female connector slot 142 is shown in one edge surface of the cove base molding for end-to-end connection, while a dovetail groove 144 is illustrated which extends along the entire back side of the cove base molding, as in the previously described embodiment.

Figure 21:
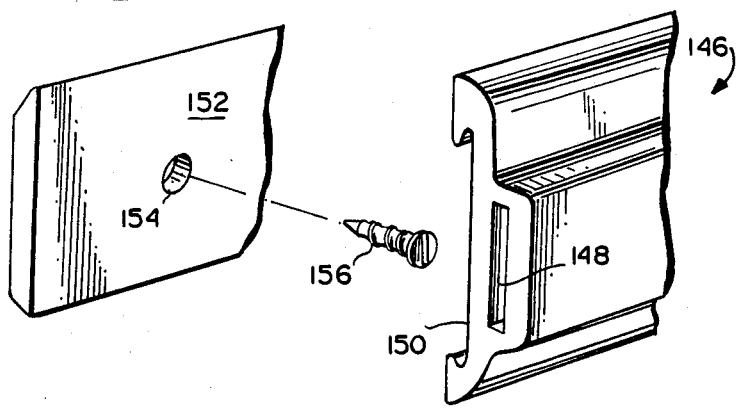
FIG. 21 is a partial perspective view illustrating a chair rail and associated attachment rail formed in accordance with the invention.
Figure 25:
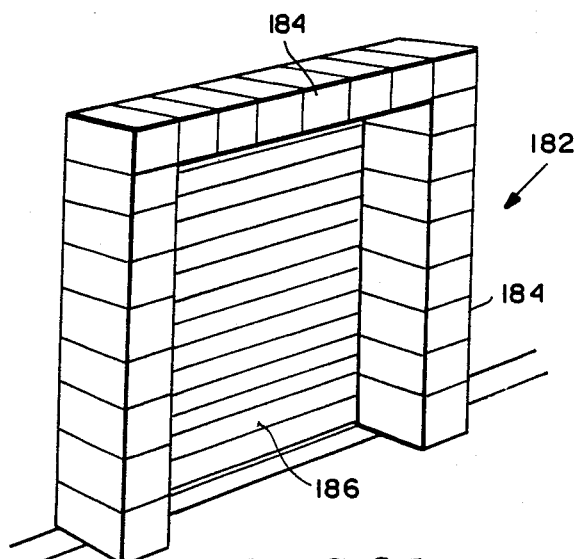
FIG. 25 is a perspective view of a modular truck docking bumper seal constructed of individual blocks formed in accordance with this invention.

FIG. 21 illustrates a blow molded or coextruded composite chair rail molding. The chair rail 146 includes a female connector slot 148 of the type previously described for end-to-end connection as well as an enlarged dovetail groove 150 designed for snap-fit engagement with a complimentary-shaped rail 152 which may be secured to a wall surface via apertures 154 and screws 156. It will be understood that the chair molding 146 has an outer polymeric skin and a foamed plastic interior core as previously described, and that the attachment rail 152 may be a solid extrusion, or a composite construction wherein the core of the attachment rail is also foamed plastic material.

Figure 22:
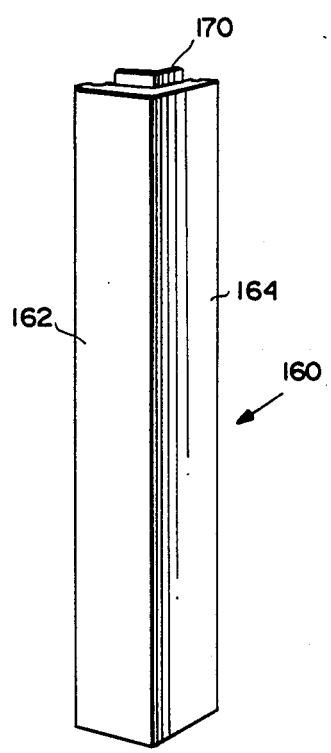
FIG. 22 is a perspective view of a corner guard formed in accordance with the invention.
Figure 23:
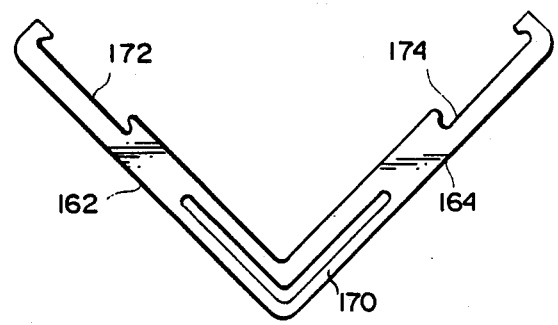
FIG. 23 is a top plan view of the corner guard illustrated in FIG. 22.
Figure 24:
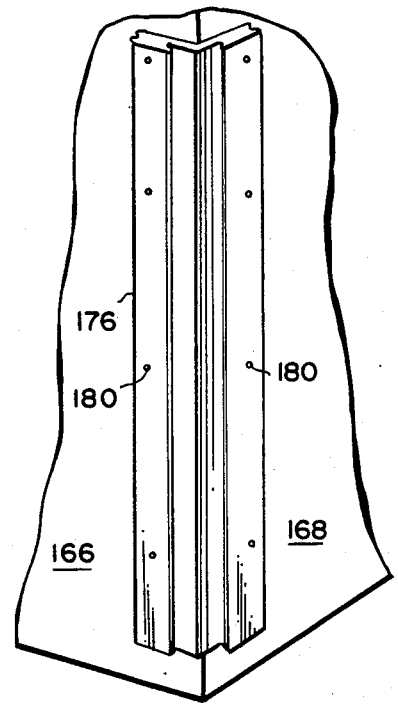
FIG. 24 is a perspective view of corner wall surfaces to which have been mounted an attachment rail for receiving the corner guard illustrated in FIG. 22.

Referring now to FIGS. 22-24, a blow molded or coextruded corner guard 160 is disclosed which is formed with the same skin and foam core construction as the floor tiles and cove base moldings described hereinabove, and which includes two, elongated substantially right-angled portions 162, 164 which are designed to protect an outside corner formed by two intersecting wall surfaces 166, 168, particularly when wall paper has been applied to one or both of the intersecting walls. As is well understood, corner guards protect the paper from fraying and/or peeling at the intersecting edge of the adjoining wall surfaces.

In the event more than one length of the corner guard is required to completely cover an exposed edge, the corner guard may be provided with a male connector 170 designed for mating engagement with a correspondingly shaped female connector (not shown) integrally formed on an adjacent corner guard section.

In the preferred form illustrated in FIG. 22 and 23, each of the right angled portions 162, 164 is formed with a dovetail slot 172, 174, respectively, which may be snap-fit into engagement with a complimentary-shaped connector rail 176, which is shown in FIG. 24 mounted on walls 166, 168 adjacent the intersecting corner edge thereof, by suitable fasteners 180. Alternatively, connector rail 176 can be made in two or more separate pieces.

As in the case of the cove base and chair rail molding, the corner guard attachment rail 176 may be formed as a solid extrusion or as a blow molded, or coextruded foam filled composite.

FIGS. 25-28 illustrate another construction element formed in accordance with the subject invention. In this exemplary embodiment, a modular dock bumper seal is formed of a plurality of composite blocks 184 which are arranged about the periphery of a sliding door or garage 186. Each block 184 is formed in accordance with the subject invention, with a blow molded or coextruded outer, polymeric skin 188 and a foamed plastic interior core 190 as best seen in FIG. 28B.

Figure 27B:
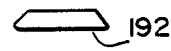
FIG. 27B is a top view of the rail illustrated in FIG. 27A.
Figure 27A:
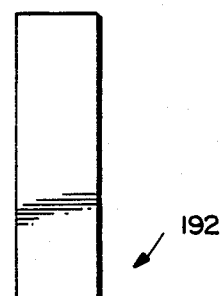
FIG. 27A is a front view of an attachment board for securing a plurality of aligned blocks of the type illustrated in FIG. 25.
Figure 26:
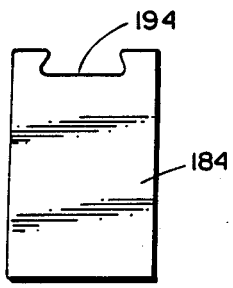
FIG. 26 is a top view of an individual block of the type illustrated in FIG. 25.

FIGS. 27A and 27B illustrate an attachment "board" 192 having a dovetail cross-section as best seen in FIG. 27B. The attachment "boards" are fixed to a wall about the periphery of the door 186 and are designed for snap-fit engagement with a plurality of the previously described blocks 184. As illustrated in FIG. 26, each block is provided along one side thereof with a dovetail groove 194 designed for complimentary engagement with an associated attachment board 192.

Figure 28B:
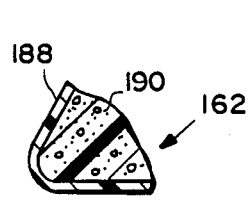
FIG. 28B is a partial cross-sectional view of the alternative block configuration illustrated in FIG. 28A.
Figure 28A:
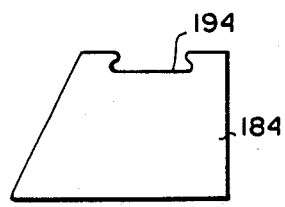
FIG. 28A is a top view of an alternative block configuration formed in accordance with this invention.

While the block 184 is illustrated in rectangular form, it will be appreciated that the block could be of a square configuration, or of the wedge type configuration illustrated in FIGS. 28A and 28B.

It will be understood that the modular dock seal disclosed in FIGS. 25-28 provides an effective resilient seal for engagement with the rear portion of a truck, for example, to provide an effective seal between the truck and the loading dock.

Figure 29:
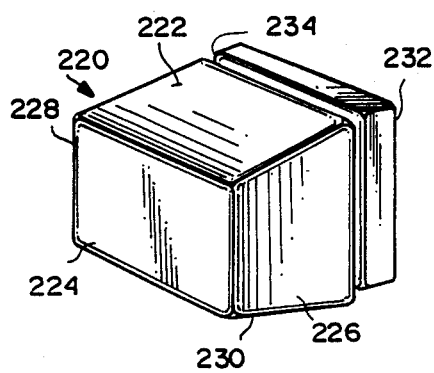
FIG. 29 is a perspective view of a boat dock bumper in accordance with the invention.
Figure 30:
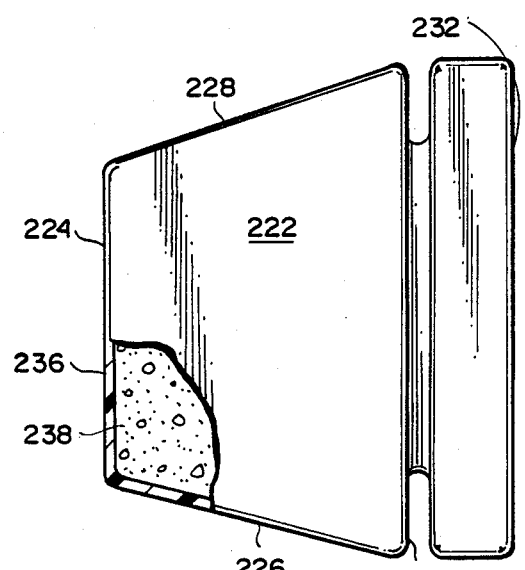
FIG. 30 is a top view, partially cut away, of the dock bumper illustrated in FIG. 29.
Figure 31:
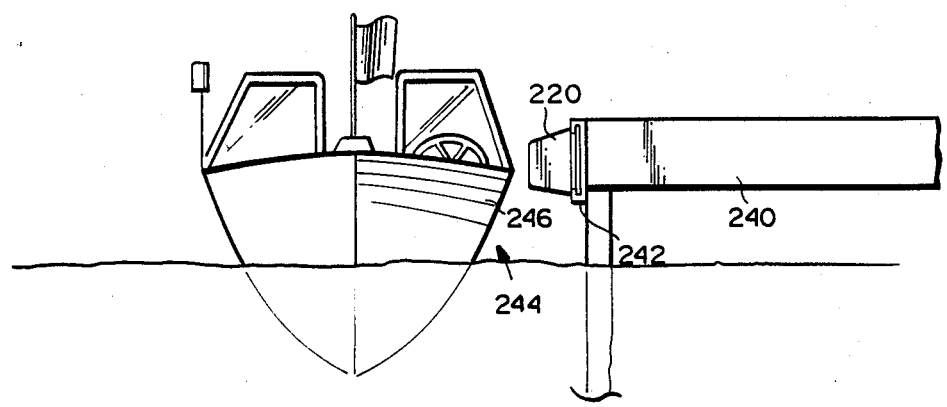
FIG. 31 is a perspective view of a dock bumper as shown in FIGS. 29 and 30 mounted on a dock.

FIGS. 29-31 illustrate another exemplary embodiment of a dock bumper, especially designed for attachment to waterfront docks and boat slips.

In FIG. 29, a perspective view of a bumper 220 is shown. The bumper, which may be blow molded or coextruded in accordance with the invention, is formed with a tapered body comprising top surface 222, front wall 224, side walls 226, 228, bottom wall 230, and rear wall 232. A peripheral groove or channel 234 is formed about the rearward portion of the bumper as an attachment mechanism described further hereinbelow.

As shown more clearly in FIG. 30, the bumper 220 is formed with an outer, polymeric skin 236, and a foamed thermoplastic interior core 238.

Referring now to FIG. 31, a dock structure 240 is illustrated schematically, with a channel connector, having a reverse C-shape, fastened to the outermost sidewall surface of the dock. The connector channel 242, which may be of metal or plastic construction, extends along the dock side wall so as to present a mounting surface for one or more bumpers 220. The bumpers may be slidably mounted at one end of the channel 242 and moved along the channel to the desired position. The specific number of bumpers used may vary, i.e., they may be placed in side-by-side relationship, or laterally spaced as desired.

Because the groove 234 extends about the entire periphery of the bumper, a further degree of flexibility is achieved in that the bumper may be mounted to present the rectangular front wall 224 in a vertical or horizontal orientation with respect to the dock. To achieve this flexibility, it is also necessary that the rearward portion of the bumper, as well as the peripheral groove or channel 234, define an essentially square shape so that the bumper will mount and slide along the channel connector in either orientation.

Once installed, bumpers 220 provide protection for the hull 246 of a boat 244 as it maneuvers for docking, as well as during periods of time when it is tied to the dock, but nevertheless subject to constant bumping due to wave action. In this regard, the bumper is soft enough to provide effective cushioning, yet strong and durable for extended life.

At the same time, in the event of damage, the affected bumpers may be easily replaced by reason of the simple, slidable mounting arrangement of the bumpers and associated connector channel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A modular bumper comprising an outer, polymeric skin and an interior core of foamed thermoplastic material, said bumper having a box-like configuration with continuous outer surface portions, and including integrally formed channel means for mounting said bumper to a complimentary-shaped connector rail.

2. A modular bumper as defined in claim 1 wherein said channel means is formed along the length of one side wall of said bumper.

3. A modular bumper as defined in claim 2 wherein said channel means is dovetail-shaped.

4. A modular bumper as defined in claim 1 wherein said channel means comprises a peripheral groove formed about a rearward portion of the bumper, and wherein said groove is adapted to slidably receive a connector rail having a generally reverse C-shape.

5. A modular bumper as defined in claim 4 wherein said box-like configuration includes continuous top, bottom, front, rear and side walls, and wherein said top, bottom and side walls taper toward said front wall.

6. A modular dock bumper assembly comprising an outer, polymeric skin and an interior core of foamed thermoplastic material, said bumper having a box-like configuration with continuous outer surface portions, and including integrally formed channel means; and an associated connector rail adapted to be fixedly secured to a dock sidewall, wherein said connector rail includes means for slidably receiving said channel means formed in said bumper.

* * * * *